2,964,506
United States Patent Office
Patented Dec. 13, 1960

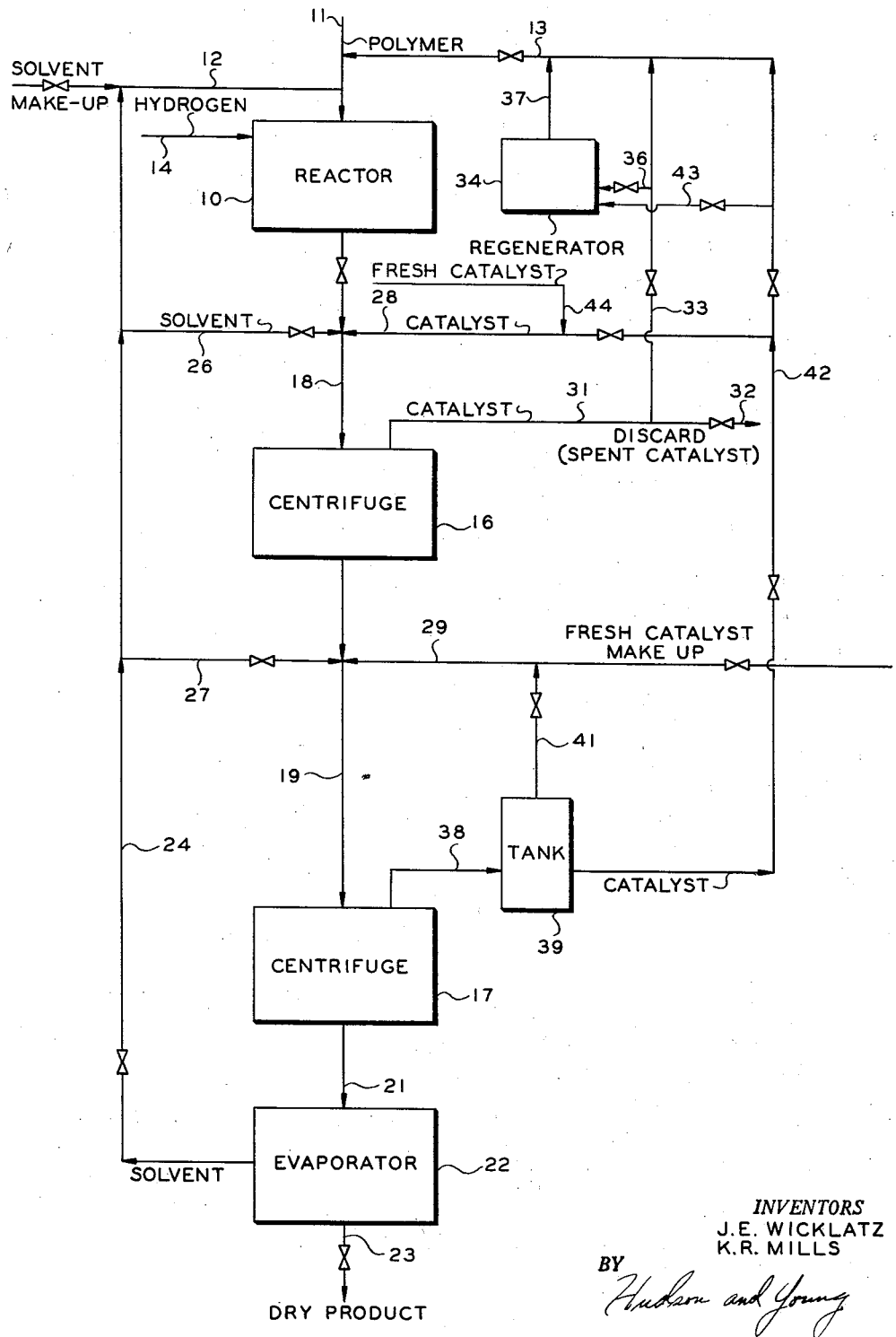

2,964,506

PROCESS FOR REMOVAL OF SOLID CATALYST FROM A SLURRY OF POLYMER AND CATALYST

John E. Wicklatz and Kenneth R. Mills, Bartlesville, Okla., assignors to Phillips Petroleum Company, a corporation of Delaware Filed Feb. 23, 1956, Ser. No. 567,227

14 Claims. (Cl. 260—83.7)

This invention relates to the removal of finely divided inorganic, solid material from high molecular weight materials.

In many operations a finely divided, inorganic, solid material is used in the production of or treatment of high molecular weight polymers. Examples of such operations include polymerization, hydrogenation of polymeric materials, and the like. While such processes are widely used, they frequently result in a difficult separation problem. Many solutions of these polymers, even with fairly high dilution, remain very viscous. Agglomeration of said inorganic materials is difficult in such solutions, this preventing simple removal operation. Other materials, such as lubricating oils and vegetable oils are frequently treated with finely divided, inorganic, solid materials and the removal of the finely divided materials is sometimes difficult without heating to excessive temperatures.

The following are objects of this invention.

An object of this invention is to provide a process for the removal of finely divided, inorganic, solid materials from high molecular weight polymers. A further object of this invention is to provide a process for the removal of a hydrogenation catalyst from a solution of a diene polymer in a solvent.

Other objects and advantages of this inveniton will be apparent to one skilled in the art upon reading this disclosure. Accompanying and forming a part of this disclosure is a drawing illustrating one specific adaptation of my invention. This specific embodiment comprises the removal of a nickel-kieselguhr catalyst from a hydrogenated polymer of a conjugated diene.

In accordance with this invention, we have discovered that finely divided, inorganic, solid material in a solution of a polymer can be agglomerated by the addition of an additional quantity of the same solid material. In a specific embodiment of this invention, a hydrogenation catalyst comprising reduced nickel-kieselguhr catalyst is removed from a solution of a diene polymer in a solvent. This catalyst, which catalyzes the hydrogenation reaction, is of very small size, the range being 1 to 8 microns with the majority of catalyst particles being within the range of 4 to 6 microns. The addition of this additional catalyst, which can be unused, unreduced catalyst, unused, reduced catalyst, or regenerated catalyst, results in agglomeration of the catalyst and permits removal of substantially all of the catalyst by any suitable means. The agglomerated catalyst will settle out of the solution and the solution of the polymer can be recovered by decantation. The catalyst can also be removed by centrifugation or filtration according to the method of our invention. As stated, the invention is applicable to the treatment of various materials. As examples of such materials there can be mentioned lubricating oils, vegetable oils, and hydrogenated diene polymers. Polymers of methylpentadiene, upon hydrogenation, are sticky materials suitable for safety glass interliners and the like but prior to such use it is necessary to remove the hydrogenation catalyst. Hydrogenated butadiene polymers are plastic materials especially suitable for low temperature applications. These materials are more fully described in an article by Jones et al. in Industrial and Engineering Chemistry, volume 45, No. 5, page 1117, May 1953. This article describes the production of these materials and discloses that the catalyst can be removed by centrifugation but where catalysts of the smallest particle size are used, say 1 to 3 microns, the use of a centrifuge alone is often comparatively ineffective. In certain instances, filtration can be used but this often requires excessive lengths of time.

The process representing a preferred modification of our invention is disclosed in the accompanying drawing. In this drawing, directed specifically to the above-mentioned hydrogenation, the rubbery polymer, usually as a solution or dispersion in a solvent is introduced to reactor 10 by means of conduit 11. Additional solvent is supplied by means of conduit 12 and catalyst is introduced through conduit 13. Hydrogen is supplied by means of conduit 14. For more details of the hydrogenation operation, attention is directed to the above-mentioned article and to application Serial No. 395,291 of Jones et al., now Patent 2,864,809, dated December 16, 1958.

Following hydrogenation, a two stage centrifuge process is preferred, these two centrifuges being designated as 16 and 17. The solution containing the polymer and catalyst is passed by means of conduit 18 to the first centrifuge and therefrom by means of conduit 19 to the second centrifuge. Following the second centrifuge operation the polymer passes through conduit 21 to evaporator 22 from which a dry product is obtained at conduit 23 and the solvent is returned to the process by means of conduit 24. The polymer solution can be diluted with an additional quantity of the solvent prior to separation of the catalyst in order to provide a concentration lower than that employed in the hydrogenation step. Conduits 26 and 27 communicating with conduits 18 and 19, respectively, are provided for this purpose. In the process shown it is possible to add an additional quantity of catalyst prior to both centrifuge operations, this being done by conduit 28 and conduit 29, these communicating, respectively, with conduits 18 and 19. Catalyst removed from centrifuge 16 is passed through conduit 31 and can be discarded by means of conduit 32 or returned to the process by means of conduits 33 and 13. If desired, all or a portion of the used catalyst can be regenerated in regenerator 34 provided with conduits 36 and 37 communicating with conduits 33 and 13 respectively. Catalyst recovered in centrifuge 17 is passed by means of conduit 38 to holding tank 39. From tank 39, the catalyst can be passed by means of conduit 41 to conduit 29 for return to the solution being centrifuged or can be passed through conduit 42 to conduit 13 for use in the hydrogenation operation, or can be added to the effluent from reactor 10 before passing to centrifuge 16. Recovered catalyst can be passed to regenerator 34 from conduit 42 by means of conduit 43. Conduit 44 is provided in order to supply fresh catalyst to the feed to centrifuge 16, when desired.

Preferably, the valves in conduit 26 and 28 are closed and the initial centrifuge operation is carried out directly on the reactor effluent. Then, additional solvent and catalyst are added for the final clarification step. Then, in such an operation, the catalyst removed in centrifuge 16 is discarded and the catalyst recovered in centrifuge 17 is returned to reactor 10.

Since removal of this catalyst from the polymer solution represents one of the most difficult separations with which we are familiar, it will be obvious to those skilled in the art that the invention is applicable to other and less difficult separations. The number of separation stages depends upon the difficulty of the separation, one stage being satisfactory in some cases, while more than two are sometimes required.

The following examples disclose operation in accordance with our invention.

EXAMPLE I

A polybutadiene solution consisting of 650 grams of polymer having a Mooney (ML-4) of 20 prepared by emulsion polymerization of butadiene at 41° F., 162 grams of nickel catalyst and 10 liters of methylcyclohexane was hydrogenated. The particular nickel catalyst employed was prepared by the electrolytic precipitation of nickel hydroxide on a kieselguhr support having a particle size of 1 to 8 microns. The catalyst was reduced by contacting it with a stream of hydrogen at 675° F. for a period of 4 hours. The metallic nickel content of the catalyst after reduction was about 47 weight percent. After thorough mixing of the hydrogenated polymer, solvent and catalyst mixture, 30 ml. portions were placed in test tubes and a quantity of slurry of unreduced, unused catalyst and methylcyclohexane (20 mg. catalyst per ml.) was added in order to introduce fixed amounts of catalyst. Additional solvent was then added to each tube to bring the total solution in each tube to about 60 ml. (depth of 20 cm. in tube). Measurements were made to indicate the distance in centimeters that the line of demarcation between the catalyst and clearer solution was below the level of the top of the solution.

The table gives the results of this work and clearly indicates the effectiveness of this method of setting the catalyst. In the table, the distance settled in centimeters is shown as a function of the settling time (vertical column) and milligrams of fresh catalyst added (horizontal row).

Table

| Amount fresh catalyst added, mg. | 0 | 5 | 25 | 50 | 100 | 200 | 400 | 600 |
|---|---|---|---|---|---|---|---|---|
| Distance settled, cm. | | | | | | | | |
| Settling time, hours: | | | | | | | | |
| 6.5 | 0.5 | 0.5 | 0.6 | 0.5 | 0.7 | 1.1 | 1.7 | 2.2 |
| 22 | 1.4 | 1.4 | 1.5 | 1.5 | 2.4 | 4.1 | 5.6 | 6.4 |
| 30.5 | 3 | 3.1 | 2.6 | 3.4 | 4.6 | 6.4 | 8.4 | 9.3 |
| 46 | 5.2 | 4.5 | 3.3 | 4.5 | 6.8 | 9.0 | 11.5 | 12.3 |
| 54 | 5.5 | 5.5 | 4.5 | 5.5 | 8.0 | 10.5 | 12.5 | 12.3 |

The quantity of used catalyst in the 30 milliliter samples was about 480 milligrams of about 250 parts of catalyst per 1000 parts of diene polymer. The quantity of catalyst left in the settled solution was approximately 2 to 5 parts per 1000 parts of polymer. This catalyst-free solution of the polymer can be recovered by decanting it from the catalyst-containing phase.

EXAMPLE II

Solid polybutadiene prepared by emulsion polymerization was hydrogenated in solution in the presence of a catalyst prepared by the electrolytic deposition of nickel hydroxide on kieselguhr, followed by reduction in a hydrogen atmosphere for seven hours at a temperature ranging from 650 to 710° F. The resulting solution contained approximately 4.8 weight percent hydrogenated polymer, 0.72 weight percent catalyst, and 95.48 weight percent methylcyclohexane. This original hydrogenation effluent was diluted with approximately an equal weight of methylcyclohexane, thus reducing the polymer concentration to about 2.4 weight percent and the catalyst concentration to about 0.36 weight percent. A portion of this solution was centrifuged in a basket-type centrifuge for five minutes at a temperature of 130° F. The product was not clear and had a very dark tint. Subsequent analysis showed that the polymer recovered contained 19.8 parts of total catalyst per 1,000 parts of the hydrogenated polymer. This run was repeated on another portion of the diluted solution except that approximately 1 to 2 cubic centimeters of the dry, unused, unreduced nickel catalyst per 50 milliliters of the hydrogenation effluent mixture was added. When this second solution was centrifuged for five minutes at room temperature, a clear solution resulted. Analysis of the polymer recovered from the second separation procedure showed 4.46 parts of total catalyst per 1,000 parts of the hydrogenated polymer.

The amount of catalyst added can vary considerably but we prefer to use at least 25 percent by weight of the catalyst present in the original slurry. Results are even more striking when the amount of catalyst added is at least equal to that originally present in the solution. For the separation, the catalyst can be reduced, or the raw catalyst, containing the nickel in the unreduced state, can be used.

Since this application is believed to be most applicable where hydrogenated polymers are being produced using a nickel-kieselguhr catalyst, we are including additional information relating to this process. Furthermore, the most valuable hydrogenated polymers are homopolymers of butadiene and copolymers of butadiene and styrene containing up to 30 parts of styrene per 100 parts by weight of monomers used to produce the polymer. The polymers are hydrogenated in a solvent which dissolves or at least disperses the polymer. Suitable solvents include saturated cyclic hydrocarbons such as cyclohexane, methylcyclohexane, decalin, and the like, preferably boiling above atmospheric temperature; aromatic hydrocarbons, such as benzene and toluene; cyclic ethers such as dioxane; and paraffinic hydrocarbons such as isooctanes, isoheptanes, and normal heptane; hydroaromatic hydrocarbons such as tetralin; and the like can also be used. Mixtures can be used if desired.

After the polymer is dissolved or dispersed in the solvent, the hydrogenation catalyst is added, hydrogen is added and the temperature raised to a suitable level to initiate the reaction. The temperature can range from 75° F. up to the degradation temperature of the polymer, maximum temperatures ranging as high as up to 1,000° F., the range of 300 to 600° F. being preferred. These temperatures are used with pressures from atmospheric to 3,000 p.s.i.g. generally 100 to 1,000 p.s.i.g. The catalyst having a particle size between 1 to 8 microns is activated at a temperature between 500 and 800° F. for a period of several hours by passing hydrogen thereover. For the preferred products, the hydrogenation is generally carried to a point at which the unsaturation of the polymer has been reduced to a value of less than 50 percent, preferably less than 30 percent, of the original theoretical unsaturation.

Specific details of the hydrogenation process as well as the details of the examples are given to illustrate specific disclosures of our invention but should not be considered unduly limiting.

We claim:

1. A process for separating partially spent nickel-kieselguhr catalyst from a reactor effluent comprising a slurry of said catalyst in a solution of hydrogenated polybutadiene in methylcyclohexane which comprises adding additional nickel-kieselguhr catalyst to said reactor effluent, and effecting a gravitational separation of the catalyst from the other components of the slurry.

2. A process for separating partially spent nickel-kieselguhr catalyst from a reactor effluent comprising a slurry of said catalyst in a solution of a hydrogenated polymer of butadiene in a solvent which comprises adding additional nickel-kieselguhr catalyst to said reactor effluent and separating substantially all of said catalyst from said slurry by gravitational separation.

3. The process of claim 2 wherein said solution is decanted from settled catalyst.

4. The process of claim 2 wherein said catalyst is separated from said solution by centrifugation.

5. The process of claim 2 wherein said catalyst is separated from said solution by filtration.

6. The process of claim 2 wherein said polymer of butadiene is a copolymer prepared by polymerizing a mixture of butadiene and not over 30 parts by weight of styrene per 100 parts by weight of monomers.

7. The process of claim 2 wherein said additional catalyst is unreduced catalyst.

8. The process of claim 2 wherein said additional catalyst is reduced catalyst.

9. A process for separating partially spent nickel-kieselguhr catalyst from a reactor effluent comprising a slurry of said catalyst in a solution of a hydrogenated polymer of butadiene in a solvent which comprises adding additional nickel-kieselguhr catalyst to said reactor effluent the amount of said added catalyst being at least 25 percent by weight of that present in the original reactor effluent, and separating substantially all of said catalyst from said slurry by gravitational separation.

10. The process of claim 9 wherein the amount of additional catalyst added is at least equal in weight to that present in said slurry.

11. The process of claim 9 wherein the catalyst recovered from said solution is regenerated and used for hydrogenation of additional polymers of butadiene.

12. The process of claim 9 wherein the catalyst recovered from said solution is recovered and used in a subsequent catalyst separation operation.

13. A process for separating nickel kieselguhr catalyst from a reactor effluent comprising a slurry of said catalyst in a solution of hydrgenated polybutadiene, said process comprising adding an additional quantity of said catalyst to said slurry, the amount of additional catalyst being at least equal in weight to that present in said slurry, separating a portion of said catalyst from said slurry by gravitational separation thereby obtaining a second slurry containing a portion of said original catalyst, adding an additional quantity of solvent and catalyst to said second slurry, separating substantially all of said original and added catalyst from said second slurry by gravitational separation, and separating solvent from said hydrogenated polybutadiene by evaporation.

14. A process for separating partially spent nickel-kieselguhr catalyst from a reactor effluent comprising a slurry of said catalyst in a solution of a member selected from the group consisting of lubricating oil, vegetable oil, hydrogenated polymers of butadiene, and hydrogenated polymers of methylpentadiene in a solvent which comprises adding additional nickel-kieselguhr catalyst to said reactor effluent, and separating substantially all of the catalyst from said slurry by gravitational separation.

References Cited in the file of this patent
UNITED STATES PATENTS

| | | |
|---|---|---|
| 2,082,519 | Ruthruff | June 1, 1937 |
| 2,447,149 | Wier | Aug. 17, 1948 |
| 2,579,601 | Nelson et al. | Dec. 25, 1951 |
| 2,692,261 | Peters et al. | Oct. 19, 1954 |
| 2,693,461 | Jones | Nov. 2, 1954 |
| 2,717,889 | Feller et al. | Sept. 13, 1955 |
| 2,743,233 | Fischer | Apr. 24, 1956 |
| 2,786,047 | Jones et al. | Mar. 19, 1957 |
| 2,816,097 | Hanson | Dec. 10, 1957 |